(12) United States Patent
Dumeur (10) Patent No.: US 10,002,323 B2
(45) Date of Patent: Jun. 19, 2018

(54) APPROXIMATE ASSIGNMENT OPERATOR FOR CONSTRAINED BASED EVOLUTIONARY SEARCH

(71) Applicant: International Business Machines Corporation, Armonk, NY (US)

(72) Inventor: Renaud Dumeur, Paris (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 855 days.

(21) Appl. No.: 14/500,092

(22) Filed: Sep. 29, 2014

(65) Prior Publication Data

US 2015/0120778 A1    Apr. 30, 2015

(30) Foreign Application Priority Data

Oct. 24, 2013    (GB) .................................. 1318809.9

(51) Int. Cl.
  *G06F 7/00*    (2006.01)
  *G06F 17/30*    (2006.01)
  *G06N 3/12*    (2006.01)
(52) U.S. Cl.
  CPC .................................... *G06N 3/126* (2013.01)
(58) Field of Classification Search
  USPC ....................................................... 707/780
  See application file for complete search history.

(56) References Cited

U.S. PATENT DOCUMENTS

| 7,685,079 B2 | 3/2010 | Watford et al. |
| 8,055,600 B2 | 11/2011 | Dumeur et al. |
| 2007/0094167 A1* | 4/2007 | Sendhoff ................ G06Q 10/04 706/13 |
| 2009/0228414 A1* | 9/2009 | Dumeur ................. G06N 3/126 706/13 |

FOREIGN PATENT DOCUMENTS

| EP | 1611546 A2 | 1/2006 |
| WO | WO2011135410 A1 | 11/2011 |

* cited by examiner

*Primary Examiner* — Tuan A Pham
*Assistant Examiner* — Muluemebet Gurmu
(74) *Attorney, Agent, or Firm* — Cantor Colburn LLP (57) ABSTRACT

Embodiments relate to approximate assignment in a constraint based evolutionary search. An aspect includes providing a genome representing a collection of variable assignment preferences encoded as genes. Another aspect includes reducing the domain until a unit sized domain is reached, the unit sized domain being an approximation to a value V. Another aspect includes searching for a first assignment of the value V that is less than or equal to the unit sized domain and a second assignment of the value V that is greater than the unit sized domain. Another aspect includes responsive to a first assignment and a second assignment being found, assigning the value V of one of the first assignment and the second assignment having the least distance from the unit sized domain to a variable X.

12 Claims, 7 Drawing Sheets

APPROXIMATE ASSIGNMENT OPERATOR FOR CONSTRAINED BASED EVOLUTIONARY SEARCH

FOREIGN PRIORITY

This application claims priority to United Kingdom Patent Application No. GB 1318809.9, filed Oct. 24, 2013, and all the benefits accruing therefrom under 35 U.S.C. § 119, the contents of which in its entirety are herein incorporated by reference.

BACKGROUND

The present disclosure relates generally to generating solutions in constrained based evolutionary searches in optimization problems, and more specifically, to finding approximate solutions in such evolutionary searches.

U.S. Pat. No. 8,055,600 B2 discloses the application of evolutionary algorithms to generate robust search strategies for problems including decision variables. Genomes of at least one triplet are encoded comprising a variable, assignment priority, and assigned value. The genome is later decoded to determine a partial or complete assignment of values to variables. If a partial assignment is reached, a search strategy may be applied to generate a complete or more complete assignment. The genomes may also be evolved to produce offspring genomes. When the genome is decoded, infeasible variable assignments are ignored.

SUMMARY

Embodiments relate to approximate assignment in a constraint based evolutionary search. An aspect includes providing a genome representing a collection of variable assignment preferences encoded as genes, each gene comprising a variable X to be assigned, and a value V to which X will be assigned from a domain D. Another aspect includes reducing the domain until a unit sized domain is reached, the unit sized domain being an approximation to the value V. Another aspect includes searching for a first assignment of the value V that is less than or equal to the unit sized domain and a second assignment of the value V that is greater than the unit sized domain. Another aspect includes responsive to a first assignment and a second assignment being found, assigning the value V of one of the first assignment and the second assignment having the least distance from the unit sized domain to the variable X. Yet another aspect includes responsive to one of a first assignment or a second assignment being found, assigning the value V of the one of the first assignment and the second assignment that was found to the variable X.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DRAWINGS

Various embodiments will now be described, by way of example only, with reference to the following drawings in which.

DETAILED DESCRIPTION OF THE EMBODIMENTS

Embodiments provide a method for approximate assignment in a constraint based evolutionary search. Embodiments allow use of infeasible variable assignments to provide valuable hints about the domain neighborhood in which a feasible variable value (close to the one encoded in the genome) can be found. The method comprises the blocks of: providing a genome representing a collection of variable assignment preferences encoded as genes, each gene comprising a variable to be assigned, X, and a value V to which X will be assigned from a domain D; reducing the domain until a unit sized domain is reached, the unit sized domain being an approximation to the value V; searching for a first assignment of the value V that is less than or equal to the unit sized domain and a second assignment of the value V that is greater than the unit sized domain; responsive to a first assignment and a second assignment being found, assigning the value V of one of the first assignment and the second assignment having the least distance from the unit sized domain to the variable X; and responsive to one of a first assignment or a second assignment being found, assigning the value V of the one of the first assignment and the second assignment that was found to the variable X.

In an embodiment, the domain is reduced until a unit sized domain is reached by the blocks of: identifying a midpoint M of the domain D having a lower bound LB and an upper bound UB; responsive to the value V being less than or equal to the midpoint M, attempting to solve the variable X in a Low direction for a value less than or equal to the midpoint M, and responsive to said attempt to solve being unsuccessful, attempting to solve the variable X in a High direction for a value greater than the midpoint M; responsive to the value V being greater than the midpoint M, attempting to solve the variable X in a High direction for a value greater than the midpoint M, and responsive to said attempt to solve being unsuccessful, attempting to solve the variable X in a Low direction for a value less than or equal to the midpoint M; and iteratively increasing the lower bound LB or decreasing the upper bound UB in response to successful attempts at solving the variable X until a unit size domain is obtained.

In a further embodiment, each gene further comprises a direction (Low, High) indicating whether only one of the search for a first assignment of the value V that is less than or equal to the unit sized domain or a search for a second assignment of the value V that is greater than the unit sized domain is to be completed.

In an embodiment a computer program product for approximate assignment in a constraint based evolutionary search, the computer program product comprising: a computer readable storage medium having computer readable program code embodied therewith, the computer readable program code adapted to perform the method described above when said program is run on a computer.

Evolutionary computation in a constraint programming context involves decoding evolved solution genomes to produce variable assignments that honor constraints stated in the problem description. For integer variables, genome decoding consists in assigning integer values to variables. Although infeasible variable assignments can be safely ignored by this decoding phase, it can be a waste to ignore them entirely, for they still may provide valuable hints about the domain neighborhood in which a feasible variable value (close to the one encoded in the genome) can be found.

U.S. Pat. No. 8,055,600 B2, hereby incorporated by reference, discloses, at paragraphs 0052 to 0061, the concept of a genome consisting of a population of evolvable representations. Each member of the population is a variable assignment preference encoded as a "gene". In the following description, genes are of the form (X,V), where X is the variable and V is the desired value for X, even in the case where (X==V) is not feasible.

An evolutionary algorithm operates on variables of a constraint programming model to interpret the genes of the form (X,V) identified above. Embodiments attempt to assign variable X to a value (V') which is preferably near to the value V and which honors model constraints. Well adapted to variables whose domain is endowed with a metric, embodiments aim at exploiting constraint propagation to select feasible assignment values, while avoiding excessive backtracking. The complexity of embodiments are O(Log (domain size of X)), where O denotes big O notation, which is used to classify algorithms by how they respond (e.g., in their processing time or working space requirements) to changes in input size.

Figure 1:
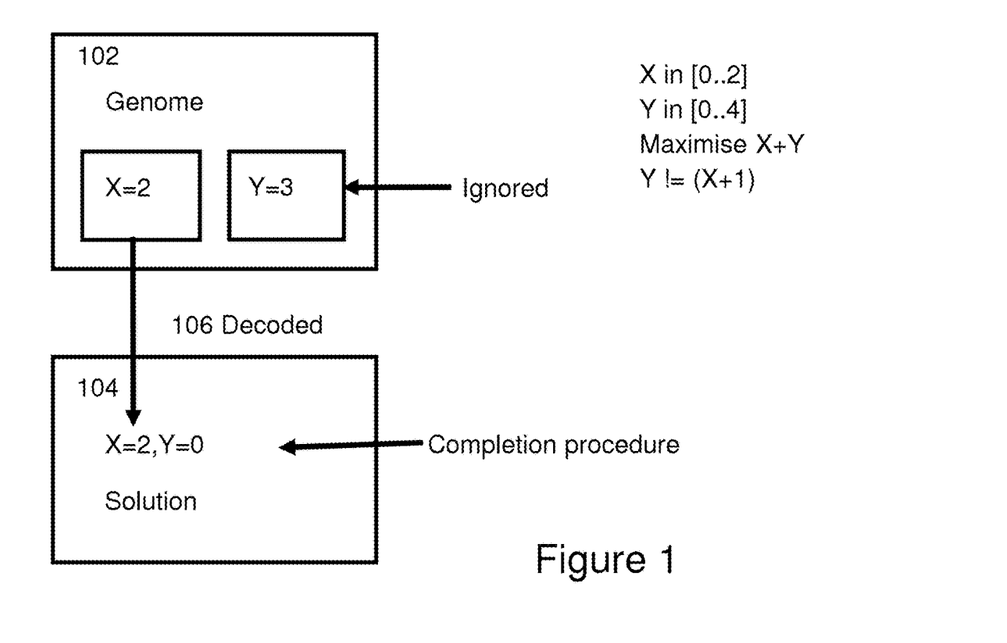
FIG. 1 shows an example of the effect of a prior art procedure for decoding genes in a genome.

FIG. 1 shows the effect of the prior art procedure for decoding genes in a genome. It describes how a single gene is decoded and how an incomplete genome is completed. (Y is ignored during decoding, and Y=0 is set by the completion procedure. It is classical in Constraint Programming to choose to assign the smallest possible value in the variable domain). FIG. 1 shows a prior art genome 102 and a solution 104. The genome 102 is decoded 106 to produce a solution 104 by interpreting each gene. Interpretation of each gene may fail due to constraint propagation, that is, it may fail to meet one or more constraints placed on the solution 104. In the prior art, failing genes are ignored. Any remaining unassigned variables are fixed using a completion procedure. Further details of this procedure can be found in U.S. Pat. No. 8,055,600 B2.

The constraints applicable in FIG. 1 are that X must be between 0 and 2 (X in [0 . . . 2]) and Y must be between 0 and 4 (Y in [0 . . . 4]). It is an objective value to "Maximise X+Y", which must be optimised. A further constraint is that Y must not be equal to X+1 (Y !=(X+1)). In the selected gene in the genome, X has a value of 2. Y has a value of 3, but this is ignored because it does not satisfy the constraint that Y must not be equal to X+1. Y=0 is set by the completion procedure described in US2009/0228414 A1, which will find an assignment (typically using the smallest value of the variable domain) for a variable that is ignored by the decoding process.

Figure 2:
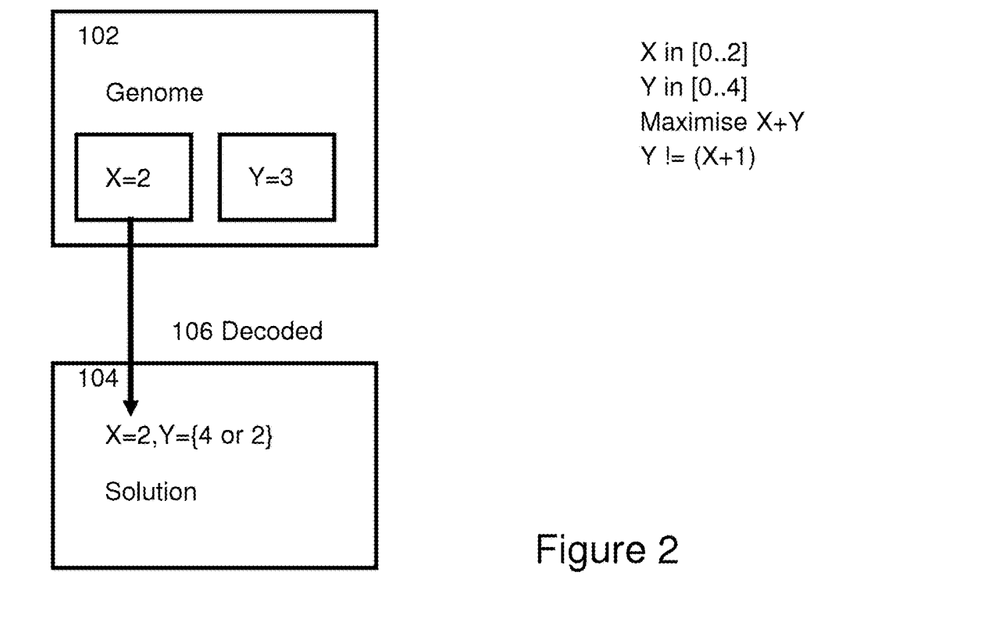
FIG. 2 shows a block diagram of an embodiment of a procedure according an embodiment of decoding genes in a genome.

FIG. 2 shows an embodiment for decoding genes in the genome to a solution using approximate assignment. The same constraints as in FIG. 1 apply. However, this time, the value of Y being 3 is not ignored. During the decoding process, values nearby to the Y value in the gene, in this case 4 or 2 are chosen. The values chosen must be within the domain (between 0 and 4), which the chosen values of 2 or 4 for Y are. The decoding gives a solution for the gene of X=2,Y={4 or 2}. This solution is a hint for approximate assignment of values.

Embodiments choose a value for Y which is compatible with the constraints referred to above with reference to FIG. 1, that is X in [0 . . . 2], Y in [0 . . . 4], Maximize X+Y and Y !=(X+1). If X=2, then Y cannot be equal to 3, because it would not satisfy Y !=(X+1). Embodiments choose a value close to 3 such that the (Y !=X+1) constraint is honored.

Figure 3:
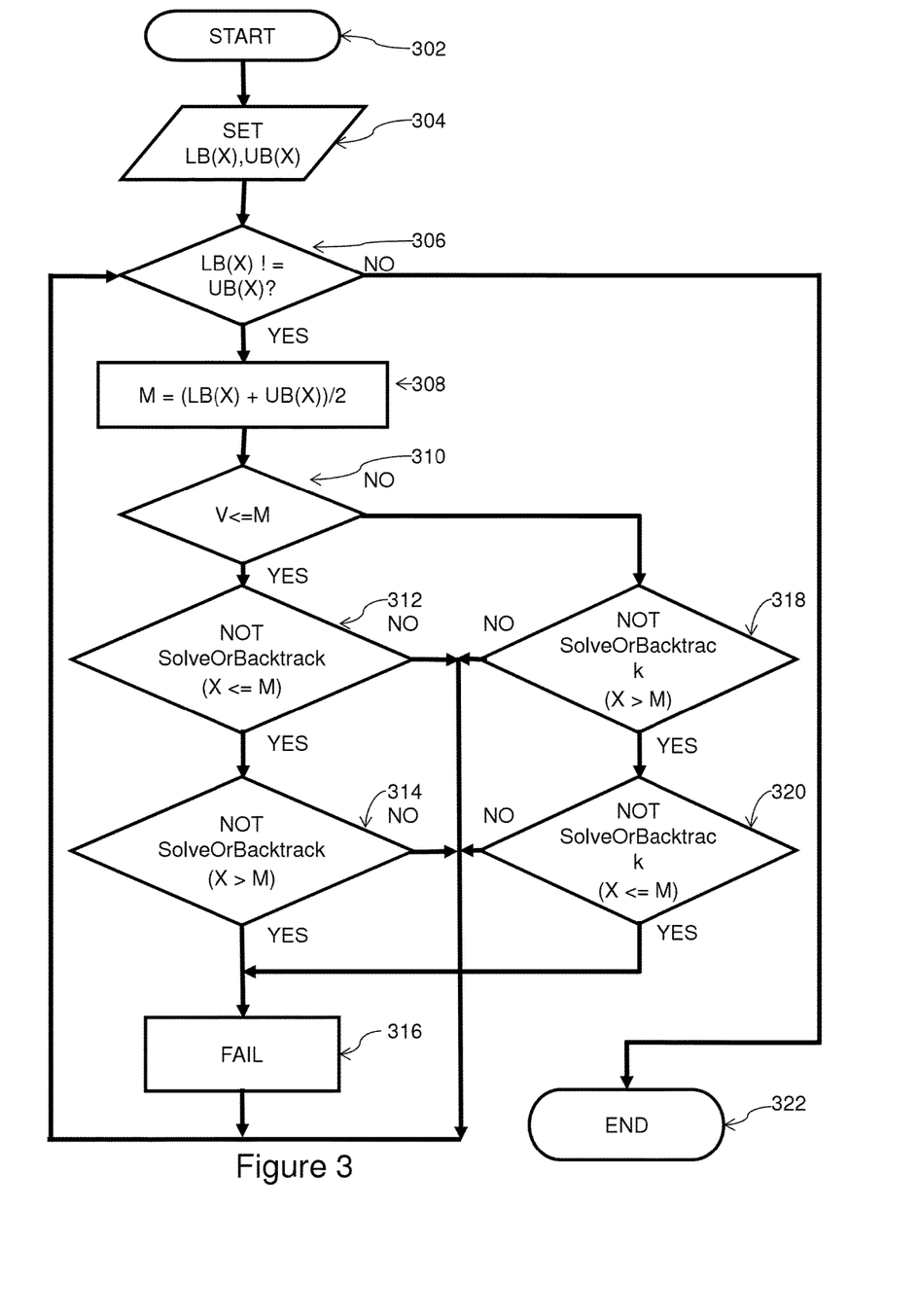
FIG. 3 shows a flow chart of an embodiment of the procedure of FIG. 2.

FIG. 3 shows a flow chart of an embodiment of the decoding procedure of FIG. 2. The flow chart of FIG. 3 is an algorithm for decoding a gene and finding an approximate value if needed. FIG. 2 describes the effect of such decoding. The procedure is called SetNear and aims to find a unit sized domain (fixed value) or to determine that such a unit size domain cannot be found. A genome consists of genes of the form (X,V) where X is a variable and V a candidate value to be assigned to X. The decoding procedure shown in FIG. 2 can be implemented by embodiments of the flow chart of FIG. 3. In simple terms, the procedure splits the variable domain in two (X<=M) and (X>M) parts. It then tries first to reduce the variable domain to the half containing the desired value. If it fails to do so, it then tries to reduce the variable domain to the other half. The procedure loops until a unit sized domain (fixed value) is found or until consecutive domain reductions lead to a failure.

An embodiment of the decoding procedure starts at block 302. At block 304, the current lower bound of the domain within which X must be located is obtained and input to the procedure as LB(X). The current upper bound of the domain within which X must be located is obtained and input to the procedure as UB(X). In the example of FIG. 2, LB(X)=0 and UB(X)=2. At block 306, a check is made to see if the lower bound of X's domain is not equal to the upper bound of X's domain. If this is not true, that is LB(X) is equal to UB(X), then processing stops at block 322. If it is not true, that is LB(X) is not equal to UB(X), then processing continues to block 308. At block 308, a variable M, the midpoint of the domain, is made equal to ((LB(X)+UB(X))/2. At block 310, a check is made as to whether the candidate value V for the variable X is less than or equal to M, that is does the candidate value fall in the lower half of X's domain. If it does, then processing moves to block 312. If it does not processing moves to block 318.

If the candidate value V for the variable X is less than or equal to M, then at block 312, a search for a value V of X that satisfies the goal, that is falls within all of the constraints, is made by calling a routine called SolveOrBacktrack with an input parameter of X<=M. The routine called SolveOrBacktrack tries to solve the goal and returns the feasibility status. If the feasibility status is false, it backtracks. Backtracking is a process by which the solver recovers its initial state. In an embodiment, the initial state may be recovered by:

(i) the solver is in state A;
(ii) we create state A' by adding (X<=M) to the solver;
(iii) if A' is infeasible, then backtracking restores the solver state to A (which does not contain X<=M); and
(iv) if A' is feasible, the solver stays in state A'.

If NOT SolveOrBacktrack (X<=M) is true, that is no solution was found, then processing continues to block 314 to see if a solution can be found in the other half of X's domain. If NOT SolveOrBacktrack (X<=M) is false, that is a solution was found, then processing returns to block 306 and UB(X) changes such that (UB(X)<=M.

At block 314, a search for a value V of X that satisfies the goal, that is falls within all of the constraints, is made by calling the routine called SolveOrBacktrack, but this time with an input parameter of X>M. If NOT SolveOrBacktrack (X<=M) is true, that is no solution was found, then processing continues to block 316. At block 316, then processing stops at block 322 and the gene (X,V) will be ignored in the same manner as the prior art procedure of FIG. 1. If NOT SolveOrBacktrack (X>M) is false, that is a solution was found, then processing returns to block 306.

If the candidate value V for the variable X is not less than or equal to M, then at block 312, a search for a value V of X that satisfies the goal, that is falls within all of the constraints, is made by calling the routine called SolveOrBacktrack with an input parameter of X>M. If NOT SolveOrBacktrack (X>M) is true, that is no solution was found, then processing continues to block 320 to see if a solution can be found in the other half of X's domain. If NOT SolveOrBacktrack (X>M) is false, that is a solution was found, then processing returns to block 306.

At block 320, a search for a value V of X that satisfies the goal, that is falls within all of the constraints, is made by calling the routine called SolveOrBacktrack, but this time with an input parameter of X<=M. If NOT SolveOrBacktrack (X<=M) is true, that is no solution was found, then processing continues to block 316. At block 316, the processing stops and the gene (X,V) will be ignored in the same manner as the prior art procedure of FIG. 1. If NOT SolveOrBacktrack (X<=M) is false, that is a solution was found, then processing returns to block 306.

A similar example of the flow chart of FIG. 3 may be represented in pseudo-code as:

```
SetNear:
    inputs:  X a constrained variable
             V a value
    while LB(X) != UB(X)
      let M = (LB(X) + UB(X))/2
      if V <= M then
        if ! SolveOrBacktrack(X <= M) then
          if ! SolveOrBacktrack(X > M) then
            Fail( )
          end if
        end if
      elsif ! SolveOrBacktrack(X > M) then
        if ! SolveOrBackTrack(X <= M) then
          Fail( )
        end if
      end if
    end while
```

If a unit size domain is found, the value of this domain may not be the nearest value to the value V. Whether or not it is depends on how the initial midpoint M is located relative to V. Due to this bias, to actually obtain the nearest value, two SetNear operations of FIG. 3 must be performed on each part of the variable domain split at the value V. This can be represented by:

SetNearLow(X,V): (X<=V) && SetNear(X, V) a search goal that tries SetNear on (X<=V)
SetNearHigh(X,V): (X>V) && SetNear(X, V) a search goal that tries SetNear on (X>V)

These are functions that perform side effects on the solver state. That is (X<=V) reduces the domain of X so that X<=V, hence following SetNear(X,V) will operate on a X with such a reduced domain. The "&&" operator composes (V<=M) and SetNear(X,V) so that if (V<=M) fails then SetNear won't be executed.

With the two search goals above (SetNearLow and SetNearHigh), the following "approximate assignment" procedure can be used to find an approximate assignment.

Figure 4:
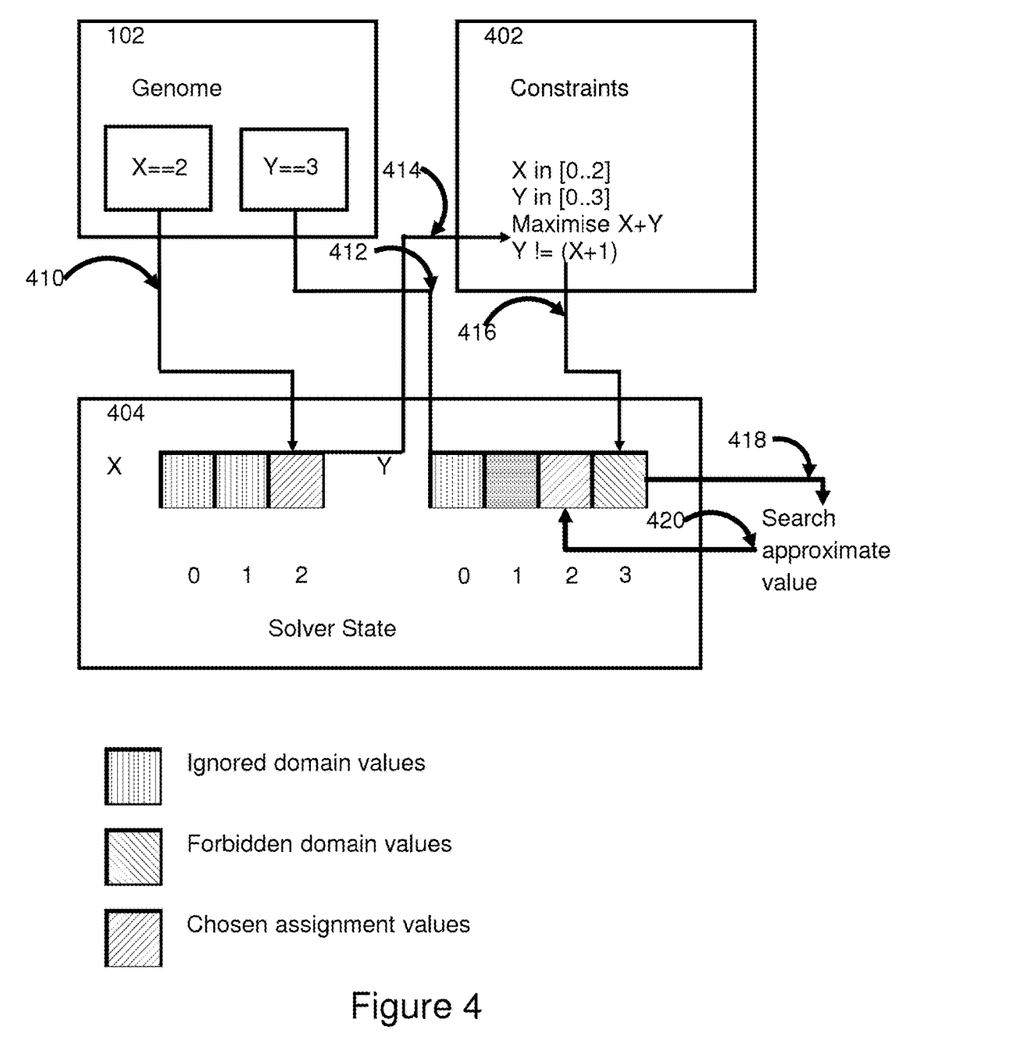
FIG. 4 shows a more detailed block diagram of the procedure of FIG. 2.

FIG. 4 shows a more detailed block diagram of the procedure of FIG. 2. In the selected gene in the genome 102, X has a value of 2 and Y has a value of 3. The constraints 402 are that X must be between 0 and 2 (X in [0 . . . 2]) and Y must be between 0 and 4 (Y in [0 . . . 4]). It is an objective value to "Maximise X+Y", which must be optimised. A further constraint is that Y must not be equal to X+1 (Y !=(X+1)). Solver state 404 is also shown. In a first decoding block 410, the solver state decodes the X value of 2 and indicates this value as a chosen assignment value. The values for X of 0 and 1 are indicated by the solver state as being ignored. In a second block 412, the solver state decodes the Y value of 3 in the gene. At block 414, the constraint of X having a value of 2 is propagated to the constraints 402. At block 416, the constraint of Y not being equal to (X+1) is propagated to the solver state. This means that the solver state indicates that Y having a value of 3, that is (X+1) is forbidden.

The value of Y as 3 in the gene is used as a starting point for a search for an approximate value of Y, that is, the forbidden nature of Y having a value of 3 does not mean that it is discarded, but it does mean that, at block 418, it is used as a starting point in the search for an assignment value. At block 420, a chosen assignment value for Y of 2 is returned. Values for Y of 0 and 1 are indicated as ignored domain values.

Figure 5:
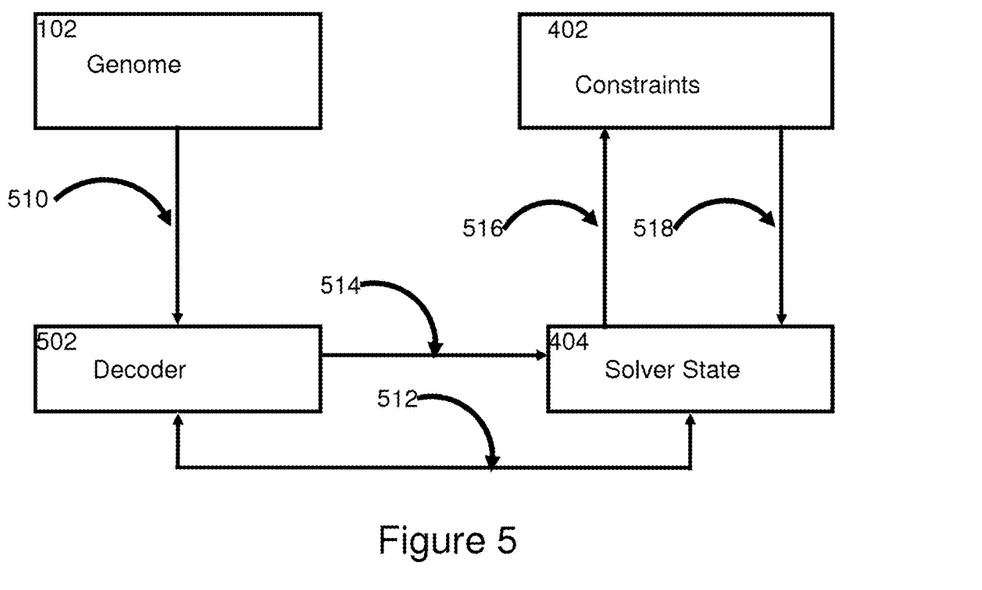
FIG. 5 shows a high level flow diagram of decoding process of the block diagram of FIG. 4.

FIG. 5 shows a high level flow diagram of decoding process of the block diagram of FIG. 4. Genes flow 510 from Genome 102 to decoder 502. A decision 514 on the variable flows from decoder 502 to solver state 404. Constraint on the variable flows 516 from solver state to constraints 402. A constraint on another variable flows 518 back from constraints 402 to solver state 404. A domain value search 512 is done using decoder 502 and solver state 404.

Figure 6:
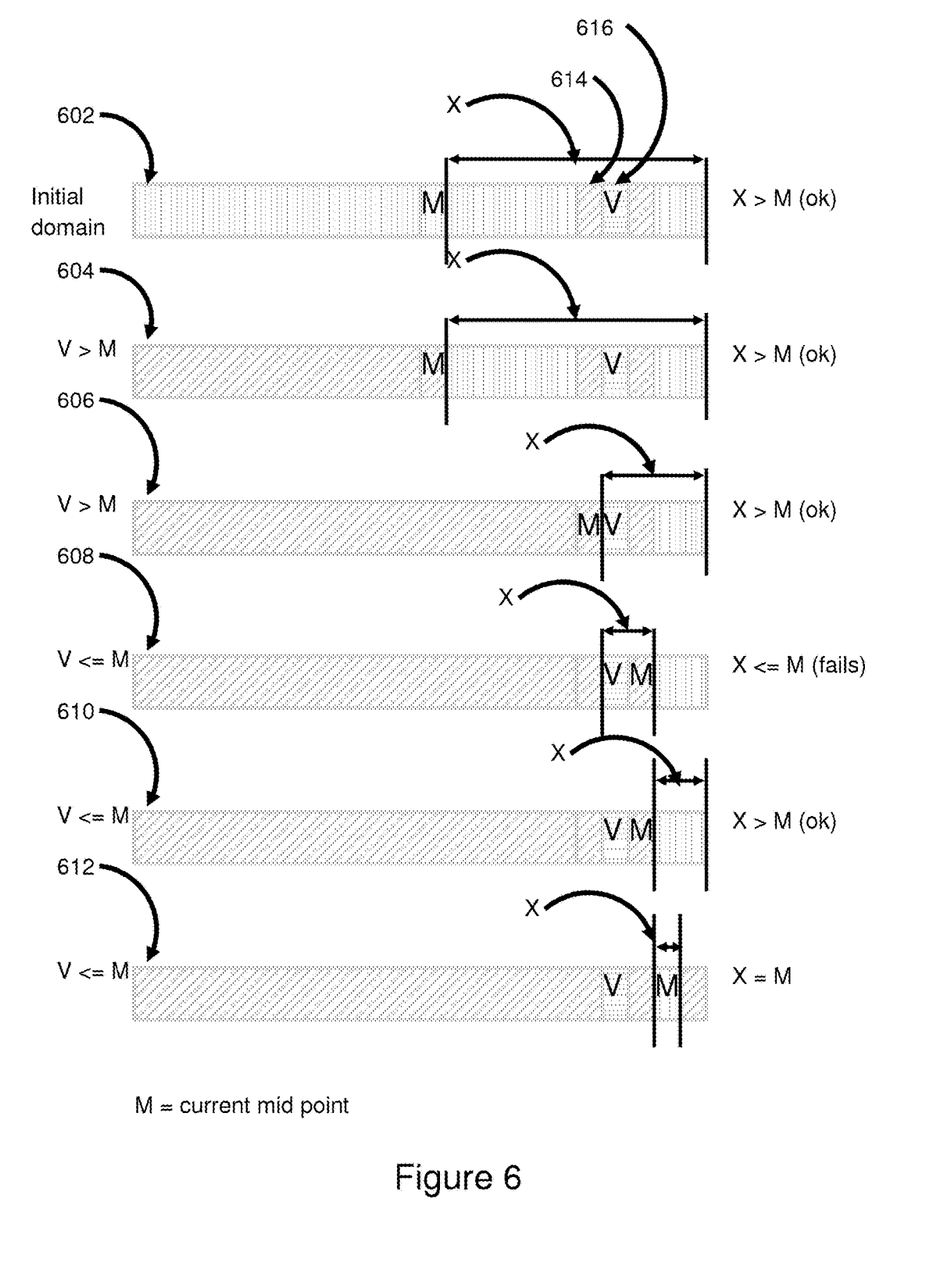
FIG. 6 shows an example of a simple approximation procedure for identifying an assignment value for a variable.

FIG. 6 shows an example of a simple approximation procedure for identifying an assignment value for a variable. The variable domain structure is such that it could lead to a sub-optimal assignment. In order to avoid a sub-optimal assignment, firstly, a dichotomic search is carried out from in a first direction, such as from left to right. Secondly, a dichotomic search is carried out in a second direction, such as from right to left. Carrying out these two searches enables the best value to assign to be identified. This procedure is not a simple dichotomic search as it involves constraint propagation.

At block 602 of the procedure is shown an initial domain of possible values for a variable X. A current midpoint M is shown. A desired assignment value V 616 from a gene is also shown. A domain hole 614 is located to the left of the desired assignment value V. A domain hole 614 is a subset of a domain in which values within the domain cannot be used. In constraint propagation, variables initially have domains where all values are possible. Propagation triggered by constraint assertions reduces such domains by removing values that would lead to constraint violations. For example, asserting (X>V) for X with domain [A . . . B] and V in [A . . . B] reduces the domain to [V+1 . . . B]. If V==B then the domain is empty because (V+1>B) a constraint violation is detected.

A range is shown of possible values for X. At block 602, the possible range of values for X is in the upper half of the domain and is shown by the double headed arrow. A first approximation procedure is completed at block 604. The desired assignment value V is greater than the current midpoint M and so the lower bound of the possible range of values for X is moved up for block 606 to the middle of the current possible range of values for X. Referring back to FIG. 3, at block 310, the test for V<=M is negative as V>M, so processing proceeds to block 318. At block 318, the test for NOT SolveOrBacktrack (X>M) is negative, that is, a solution exists within the domain, so processing returns to block 306.

A second approximation procedure is completed at block 606. Referring back to FIG. 3, at block 310, the test for V<=M is negative as V>M, so processing proceeds to block 318. At block 318, the test for NOT SolveOrBacktrack (X>M) is negative, that is, a solution exists within the domain, so processing returns to block 306.

A third approximation procedure is completed at block 608. Referring back to FIG. 3, at block 310, the test for V<=M is positive as V<=M, so processing proceeds to block 312. At block 312, the test for NOT SolveOrBacktrack (X<=M) is positive, so processing returns to block 314. At block 314, the test for NOT SolveOrBacktrack (X>M) is negative, that is, a solution exists within the domain, so processing returns to block 306.

A fourth approximation procedure is completed at block 610. Referring back to FIG. 3, at block 310, the test for V<=M is positive as V<=M, so processing proceeds to block 312. At block 312, the test for NOT SolveOrBacktrack (X<=M) is negative, so processing returns to block 306.

A fifth approximation procedure is completed at block 612. Referring back to FIG. 3, at block 310, the test for V<=M is positive as V<=M, so processing proceeds to block 312. At block 312, the test for NOT SolveOrBacktrack (X<=M) is negative, so processing returns to block 306. As LB(X) is equal to UB(X), then processing ends at block 322.

Figure 7:
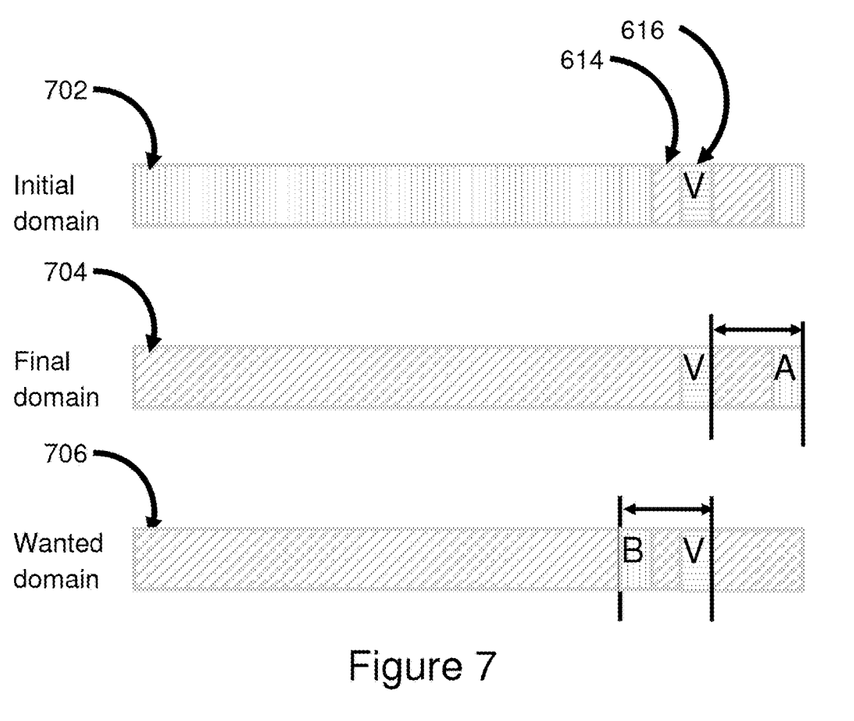
FIG. 7 shows an example of the approximation procedure of FIG. 6 according to an embodiment.
Figure 8:
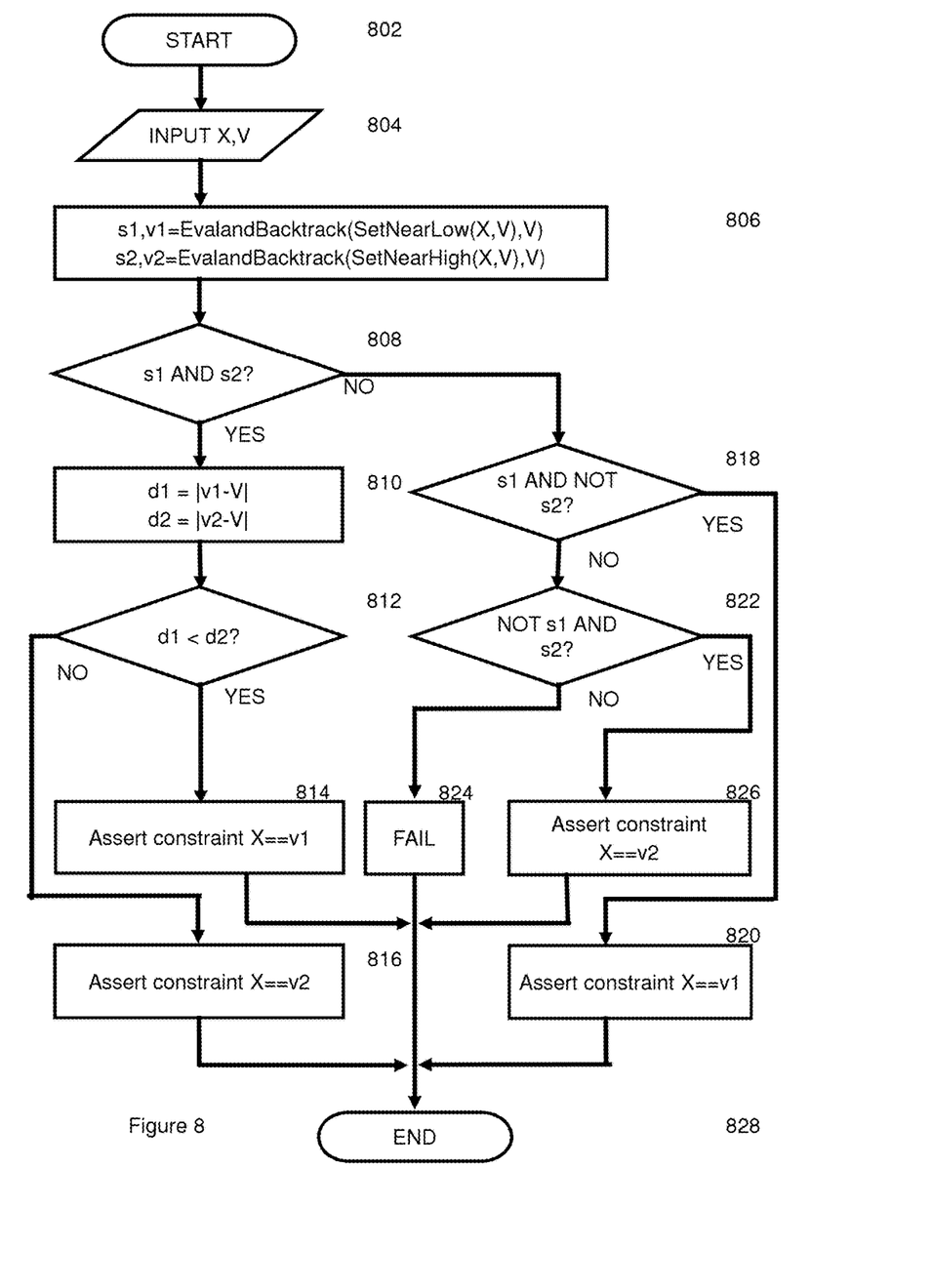
FIG. 8 shows a flow chart of an approximate assignment procedure using an embodiment to ensure that the nearest value is obtained.

FIG. 7 shows an example of the approximation procedure of FIG. 6 according to an embodiment. Referring forward to FIG. 8, at block 806, SetNearLow is performed and finds a first approximate value B. Also at block 806, SetNearHigh is performed and finds a second approximate value A. At block 808, as S1 AND S2 is TRUE, the processing proceeds to block 810, where the one of A or B that is closest V is chosen for assignment. If at block 806, when SetNearLow is performed no approximate value B is found, then at block 818, S1 AND NOT S2 is FALSE, and processing proceeds to block 822. At block 822, NOT S1 AND S2 is TRUE, and processing proceeds to block 826, where A is chosen for assignment. If at block 806, when SetNearHigh is performed no approximate value A is found, then at block 818, S1 AND NOT S2 is TRUE, and processing proceeds to block 820, where B is chosen for assignment. If at block 806, when SetNearLow is performed no approximate value B is found and when SetNearHigh is performed no approximate value A is found, then processing proceeds to block 818. At block 818, S1 AND NOT S2 is FALSE, and processing proceeds to block 822. At block 822, NOT S1 AND S2 is FALSE, and processing proceeds to block 824, where no possible assignment is found and the assignment fails. The process ends at block 828.

FIG. 8 shows a flow chart of an embodiment of an approximate assignment procedure to ensure that the nearest value is obtained. The procedure is called SetNearest and it decodes one gene so that the assigned value is as near as possible to the hint provided by the gene. It uses the search goals described with reference to FIG. 3 above.

An embodiment of the approximate assignment procedure starts at block 802. At block 804, the constrained variable X and a value V are input.

At block 806, the search goal of SetNearLow described above is carried out on variables X and V. As explained above, this tries the SetNear operation on (X<=V). The goal returned by this SetNear operation is then used as input to a first EvalAndBackTrack procedure. Also at block 806, the search goal of SetNearHigh described above is carried out on variables X and V. As explained above, this tries the SetNear operation on (X>V). The goal returned by the SetNear operation is then used as input to a second EvalAndBackTrack procedure.

The EvalAndBackTrack procedure is passed a <goal> parameter which is the goal to be solved and a variable <var> parameter. It returns two parameters, <s>, which is the status of the solve and <v> which is the value of <var> if the solve was successful. If the solver fails, the solver state is backtracked before returning.

The first EvalAndBackTrack procedure returns parameters s1 and v1 and the second EvalAndBackTrack procedure returns parameters s2 and v2.

At block 808, a check is made as to whether s1 AND s2 are both TRUE, that is if both of the search goals returned solutions.

If s1 AND s2 are both TRUE, then processing moves to block 810. At block 810, the distance d1 is computed by taking the magnitude of (v1−V), that is the difference between the value of the solution from the SetNearLow search goal and the input value V. Similarly, the distance d2 is computed by taking the magnitude of (v2−V), that is the difference between the value of the solution from the SetNearHigh search goal and the input value V. At block 812, a check is made as to whether the distance d1 is less than the distance d2. If it is, then processing proceeds to block 814 where the constraint X==v2 is asserted. The embodiment of the approximate assignment procedure ends at block 828. If it is not, then processing proceeds to block 816 where the constraint X==v1 is asserted. The embodiment of the approximate assignment procedure ends at block 828. In summary, blocks 810 to 816 are followed if both of the search goals returned solutions. The output of the search goal which is the closest to the input value V is then used as the constraint on the value X.

If either of s1 or s2 are not TRUE, that is, one of the search goals did not return a solution, then processing moves to block 818. At block 818, a check is made as to whether s1 was TRUE and s2 was NOT TRUE. If it is, then processing proceeds to block 820 where the constraint X==v1 is asserted. The embodiment of the approximate assignment procedure ends at block 828. If it is not, then processing proceeds to block 822. At block 822, a check is made as to whether s1 was NOT TRUE and s2 was TRUE. If it is, then processing proceeds to block 826 where the constraint X==v2 is asserted. The embodiment of the approximate assignment procedure ends at block 828. If it is not, then processing moves to block 824. At block 824, it is indicated that the approximate assignment procedure has failed and the gene will be ignored. The embodiment of the approximate assignment procedure ends at block 828. In summary, blocks 818 to 826 are followed if either none or one of the search goals returned solutions. If none of the search goals returned solutions, then the approximate assignment failed. If one of the search goals returned solutions, then the output of the successful search goal is then used as the constraint on the value X.

A similar example of the flow chart of FIG. 8 may be represented in pseudo-code as:

```
SetNearest:
    input:  X a constrained variable
            V a value
        s1, v1 = EvalAndBacktrack(SetNearLow(X,V), V)
        s2, v2 = EvalAndBacktrack(SctNcarHigh(X, V), V)
        if(s1 && s2)
            compute distance d1 = |v1 - V| and d2 = |v2 - V|
            if d1 < d2 then
                assert constraint: X == v1
            else
                assert constraint X == v2
            end if
        elsif s1 && !s2 then
            assert X == v1
        elsif !s1 && s2 then
            assert X == v2
        else
            Fail( )
        end if
where:
EvalAndBacktrack(<goal>, <var>) is a procedure that solves the
passed <goal>, and returns two elements:
        - the status of the solve
        - the value of <var> if solve was successful
If the solve fails, the solver state is backtracked before returning.
```

The complexity of embodiments of this procedure is also O(Log(domain size of X)), where O denotes big O notation, which is used to classify algorithms by how they respond (for example, in their processing time or working space requirements) to changes in input size. This complexity measure is limited to the procedure itself, and does not take into account complexities of the various constraint propagation algorithms triggered by constraint assertions.

In an embodiment, it can be even more efficient, for an evolutionary algorithm, to also allow the direction (Low, High) of the SetNear operation to evolve in the genome. In this embodiment, the gene encoding the assignment must specify this operator direction (D) along with the target value (V) to be assigned to the variable (X). As a consequence, the genome to be decoded will consist of a set of evolved triples (X,V,D), and the decoding procedure will be chosen depending on D's value (Low, High), eventually calling the appropriate specialized (SetNearLow, SetNearHigh) method.

In such an embodiment of approximate variable assignment, efficient propagation of the assigned variable domain is required. If there is not efficient propagation, the SetNear procedure is likely to fail as it may reduce the domain of the variable to an infeasible area, thus failing to find an approximate value to assign. To avoid such failure, embodiments of the decoding method can be used as an alternative to the gene decoding procedure operator disclosed in US patent application US 2009/0228414 where the variable X is assigned to V, the assignment being ignored if infeasible. The decoding procedure choice can be encoded in the genome and can be subject to evolution. Its occurrence in the genome can be adapted on a per-variable basis. In a generalised form, the D element of the (X,V,D) triple can be used to denote alternative decoding procedures (D) such as:

SearNeatLow, SetNearHigh: approximate assignment disclosed above

Assignment: (X==V) exact assignment

LessThanOrEqual: (X<=V) domain reduction

GreaterThanOrEqual: (X>=V) domain reduction

A gene decoding goal can be then written:
Decide(X,V,D): ChooseAlternativeDecoder(D)(X,V)
where ChooseAlternativeDecoder(D) returns the decoding goal factory for the decoding procedure D.

In another embodiment, embodiments of the approximation procedure are used as a fallback procedure. For example, the strict (X==V) assignment decoding is extended as:
Decode(X,V): (X==V)||SetNearest(X, V)
When using generalized genes of the (X,V,D) form, the fallback mechanism becomes:
Decode(X,V,D): (X==V)||ChooseAlternativeDecoder(D)(X,V)

The present invention may be a system, a method, and/or a computer program product. The computer program product may include a computer readable storage medium (or media) having computer readable program instructions thereon for causing a processor to carry out aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects. Aspects are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope.

What is claimed is:

1. A method for approximate assignment in a constraint based evolutionary search, comprising:
   providing a genome representing a collection of variable assignment preferences encoded as genes, each gene comprising a variable X to be assigned, and a value V to which X will be assigned from a domain D;
   reducing the domain until a unit sized domain is reached, the unit sized domain being an approximation to the value V;
   searching for a first assignment of the value V that is less than or equal to the unit sized domain and a second assignment of the value V that is greater than the unit sized domain;
   responsive to a first assignment and a second assignment being found, assigning the value V of one of the first assignment and the second assignment having the least distance from the unit sized domain to the variable X; and
   responsive to one of a first assignment or a second assignment being found, assigning the value V of the one of the first assignment and the second assignment that was found to the variable X;
   wherein the domain is reduced until a unit sized domain is reached by:
   identifying a midpoint M of the domain D having a lower bound LB and an upper bound UB;
   responsive to the value V being less than or equal to the midpoint M, attempting to solve the variable X in a Low direction for a value less than or equal to the midpoint M, and responsive to said attempt to solve being unsuccessful, attempting to solve the variable X in a High direction for a value greater than the midpoint M;
   responsive to the value V being greater than the midpoint M, attempting to solve the variable X in a High direction for a value greater than the midpoint M, and responsive to said attempt to solve being unsuccessful, attempting to solve the variable X in a Low direction for a value less than or equal to the midpoint M; and
   iteratively increasing the lower bound LB or decreasing the upper bound UB in response to successful attempts at solving the variable X until a unit size domain is obtained.

2. The method of claim 1, further comprising, prior to providing the genome representing the collection of variable assignment preferences encoded as genes, the value V being assigned to X is the value of the unit sized domain D.

3. The method of claim 1, wherein each gene further comprises a direction comprising one of Low and High, the direction indicating whether only one of the search for a first assignment of the value V that is less than or equal to the unit sized domain or a search for a second assignment of the value V that is greater than the unit sized domain is to be completed.

4. The method of claim 1, further comprising, prior to providing the genome representing the collection of variable assignment preferences encoded as genes, assigning the value V to X, wherein V is the value of the unit sized domain D.

5. A computer program product for approximate assignment in a constraint based evolutionary search, the computer program product comprising a non-transitory computer readable storage medium having program instructions embodied therewith, the program instructions executable by a processor to cause the processor to:
providing a genome representing a collection of variable assignment preferences encoded as genes, each gene comprising a variable X to be assigned, and a value V to which X will be assigned from a domain D;
reducing the domain until a unit sized domain is reached, the unit sized domain being an approximation to the value V;
searching for a first assignment of the value V that is less than or equal to the unit sized domain and a second assignment of the value V that is greater than the unit sized domain;
responsive to a first assignment and a second assignment being found, assigning the value V of one of the first assignment and the second assignment having the least distance from the unit sized domain to the variable X; and
responsive to one of a first assignment or a second assignment being found, assigning the value V of the one of the first assignment and the second assignment that was found to the variable X;
wherein the domain is reduced until a unit sized domain is reached by:
identifying a midpoint M of the domain D having a lower bound LB and an upper bound UB;
responsive to the value V being less than or equal to the midpoint M, attempting to solve the variable X in a Low direction for a value less than or equal to the midpoint M, and
responsive to said attempt to solve being unsuccessful, attempting to solve the variable X in a High direction for a value greater than the midpoint M;
responsive to the value V being greater than the midpoint M, attempting to solve the variable X in a High direction for a value greater than the midpoint M, and responsive to said attempt to solve being unsuccessful, attempting to solve the variable X in a Low direction for a value less than or equal to the midpoint M; and
iteratively increasing the lower bound LB or decreasing the upper bound UB in response to successful attempts at solving the variable X until a unit size domain is obtained.

6. The computer program product of claim 5, further comprising, prior to providing the genome representing the collection of variable assignment preferences encoded as genes, the value V being assigned to X is the value of the unit sized domain D.

7. The computer program product of claim 5, wherein each gene further comprises a direction comprising one of Low and High, the direction indicating whether only one of the search for a first assignment of the value V that is less than or equal to the unit sized domain or a search for a second assignment of the value V that is greater than the unit sized domain is to be completed.

8. The computer program product of claim 5, further comprising, prior to providing the genome representing the collection of variable assignment preferences encoded as genes, assigning the value V to X, wherein V is the value of the unit sized domain D.

9. A computer system for approximate assignment in a constraint based evolutionary search, the system comprising:
a memory; and
a processor, communicatively coupled to said memory, the computer system configured to perform a method comprising:
providing a genome representing a collection of variable assignment preferences encoded as genes, each gene comprising a variable X to be assigned, and a value V to which X will be assigned from a domain D;
reducing the domain until a unit sized domain is reached, the unit sized domain being an approximation to the value V;
searching for a first assignment of the value V that is less than or equal to the unit sized domain and a second assignment of the value V that is greater than the unit sized domain;
responsive to a first assignment and a second assignment being found, assigning the value V of one of the first assignment and the second assignment having the least distance from the unit sized domain to the variable X; and
responsive to one of a first assignment or a second assignment being found, assigning the value V of the one of the first assignment and the second assignment that was found to the variable X;
wherein the domain is reduced until a unit sized domain is reached by:
identifying a midpoint M of the domain D having a lower bound LB and an upper bound UB;
responsive to the value V being less than or equal to the midpoint M, attempting to solve the variable X in a Low direction for a value less than or equal to the midpoint M, and responsive to said attempt to solve being unsuccessful, attempting to solve the variable X in a High direction for a value greater than the midpoint M;
responsive to the value V being greater than the midpoint M, attempting to solve the variable X in a High direction for a value greater than the midpoint M, and responsive to said attempt to solve being unsuccessful, attempting to solve the variable X in a Low direction for a value less than or equal to the midpoint M; and
iteratively increasing the lower bound LB or decreasing the upper bound UB in response to successful attempts at solving the variable X until a unit size domain is obtained.

10. The system of claim 9, further comprising, prior to providing the genome representing the collection of variable assignment preferences encoded as genes, the value V being assigned to X is the value of the unit sized domain D.

11. The system of claim 9, wherein each gene further comprises a direction comprising one of Low and High, the direction indicating whether only one of the search for a first assignment of the value V that is less than or equal to the unit sized domain or a search for a second assignment of the value V that is greater than the unit sized domain is to be completed.

12. The system of claim 9, further comprising, prior to providing the genome representing the collection of variable assignment preferences encoded as genes, assigning the value V to X, wherein V is the value of the unit sized domain D.

* * * * *